(12) United States Patent
Imai et al.

(10) Patent No.: US 6,796,138 B1
(45) Date of Patent: Sep. 28, 2004

(54) AIR CONDITIONING SYSTEMS AND VEHICLES COMPRISING SUCH AIR CONDITIONING SYSTEMS

(75) Inventors: Tomonori Imai, Isesaki (JP); Atsuo Inoue, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 10/628,370

(22) Filed: Jul. 29, 2003

(30) Foreign Application Priority Data

Aug. 1, 2002 (JP) ........................................ 2002/224645

(51) Int. Cl.$^7$ ............................................... F04B 49/00
(52) U.S. Cl. ........................................ 62/236; 417/16
(58) Field of Search ................................ 62/228.4, 236, 62/323.3; 417/16

(56) References Cited

U.S. PATENT DOCUMENTS

| | | | |
|---|---|---|---|
| 5,651,260 A | * | 7/1997 | Goto et al. ................... 62/126 |
| 5,867,996 A | | 2/1999 | Takano et al. |
| 6,192,155 B1 | | 2/2001 | Fan |
| 6,217,297 B1 | | 4/2001 | Tsumagari et al. |
| 6,230,507 B1 | | 5/2001 | Ban et al. |
| 6,234,769 B1 | | 5/2001 | Sakai et al. |
| 6,247,899 B1 | | 6/2001 | Ban et al. |
| 6,287,081 B1 | | 9/2001 | Tamegai et al. |
| 6,334,755 B1 | | 1/2002 | Coudray et al. |
| 6,375,436 B1 | | 4/2002 | Irie et al. |
| 6,443,712 B2 | | 9/2002 | Sakai et al. |
| 6,543,243 B2 | | 4/2003 | Mohrmann et al. |
| 6,675,597 B2 | * | 1/2004 | Ieda et al. .................... 62/244 |
| 2003/0053916 A1 | | 3/2003 | Terauchi |
| 2003/0136138 A1 | | 7/2003 | Tsuboi et al. |
| 2003/0152467 A1 | | 8/2003 | Higashiyama et al. |

FOREIGN PATENT DOCUMENTS

JP 529153 6/1993

* cited by examiner

*Primary Examiner*—William E. Tapolcai
(74) *Attorney, Agent, or Firm*—Baker Botts L.L.P.

(57) ABSTRACT

An air conditioning system for a vehicle including a first drive source, includes a compressor. The compressor includes a second drive source, and the compressor is driven by the first drive source or the second drive source, or a combination thereof. Moreover, the second drive source includes an electrical power supply. The air conditioning system also includes a controller for selecting the first drive source or the second drive source, or both, for driving the compressor. The controller also controls a rotational speed of the second drive source. Moreover, the air conditioning system also includes a voltmeter or an amp meter for detecting an amount of electrical power consumed by the second drive source. Specifically, when a predetermined condition is satisfied and an amount of electrical power consumed by the second drive source is greater than a first limit for the amount of electrical power which the second drive source may consume, the first limit increases to a second limit.

27 Claims, 1 Drawing Sheet

AIR CONDITIONING SYSTEMS AND VEHICLES COMPRISING SUCH AIR CONDITIONING SYSTEMS

BACKGROUND OF THE INVENTION

1. Field of the Invention

The present invention relates generally to air conditioning systems which include a hybrid compressor, and vehicles comprising such air conditioning systems. In particular, the present invention is directed towards vehicles and air conditioning systems, in which a limit for an amount of electrical power, which an electric drive source of the hybrid compressor may consume, varies during operation of the air conditioning system.

2. Description of Related Art

Known hybrid vehicles include a first drive source, e.g., an engine, and a known air conditioning system. Such known air conditioning systems, such as the air conditioning system described in U.S. Pat. No. 5,867,996, include a hybrid compressor and a refrigeration system. The hybrid compressor includes a second drive source, e.g., an electric motor, and an electrical power supply, e.g., a battery, for the second drive source. The hybrid compressor may be driven by the first drive source or the second drive source, or both. Specifically, the first drive source drives the hybrid compressor when the first drive source is engaged, and the second drive source drives the hybrid compressor when the first drive source is disengaged. As such, whether the first drive source or the second drive source drives the hybrid compressor depends on whether the first drive source is engaged or disengaged.

In such known air conditioning systems, when the second drive source drives the hybrid compressor, the compressor consumes electrical power. Moreover, a limit for the amount of electrical power which the compressor may consume is preselected, and the rotational speed of the compressor is controlled, such that the amount of electrical power consumed by the compressor is less than or equal to the preselected amount of electrical power. Nevertheless, if the preselected amount of electrical power is less than an optimum amount of electrical power, the air conditioning system may be unable to deliver sufficiently cooled air or sufficiently heated air to an interior of the vehicle when a load of the refrigeration system is greater than a predetermined load. Similarly, if the preselected amount of electrical power is greater than the optimum amount of electrical power, the ability of the second drive source to drive the compressor for extended periods of time is reduced.

SUMMARY OF THE INVENTION

Therefore, a need has arisen for air conditioning systems for vehicles which overcome these and other shortcomings of the related art. A technical advantage of the present invention is that a limit for the amount of electrical power which the second drive source of the hybrid compressor may consume varies during an operation of the air conditioning system. Specifically, when the amount of electrical power consumed by the second drive source is greater than a first limit for the amount of electrical power which the second drive source may consume, the air conditioning system may (1) decrease the rotational speed of the second drive source until the amount of electrical power consumed by the second drive source is less than or equal to the first limit, and (2) increase the limit for the amount of electrical power which the second drive source of the hybrid compressor may consume from the first limit to a second limit. Whether the air conditioning system merely decreases the rotational speed of the second drive source, or decreases the rotational speed of the second drive source and increases the first limit to the second limit, may depend on whether predetermined conditions are satisfied. Satisfaction of the predetermined conditions may indicate that it is desirable to increase the first limit to the second limit, or that the first limit may increase to the second limit without substantial adverse affects to the ability of the second drive source to drive the hybrid compressor or the vehicle, or both.

According to an embodiment of the present invention, an air conditioning system for a vehicle comprising a first drive source, comprises at least one compressor. The at least one compressor comprises a second drive source, and the at least one compressor is driven by the first drive source or the second drive source, or a combination thereof. The second drive source comprises an electrical power supply. The air conditioning system also comprises means for selecting at least one of the first rive source and the second drive source for driving the at least one compressor, e.g., a controller, and means for detecting an amount of electrical power consumed by the second drive source, e.g., a voltmeter or an amp meter. Moreover, the air conditioning system comprises means for controlling a rotational speed of the second drive source. Specifically, when at least one predetermined condition is satisfied and an amount of electrical power consumed by the second drive source is greater than a first limit of the amount of electrical power which the second drive source may consume, the first limit increases to a second limit. For example, the air conditioning system also may comprises a refrigeration system, and the at least one predetermined condition may be satisfied when a load of the refrigeration system is greater than a predetermined load. The at least one predetermined condition also may be satisfied when an amount of electric power stored in the electric power supply is greater than or equal to a predetermined amount of stored electric power. Moreover, the at least one predetermined condition may be satisfied when an amount of electrical power consumed by at least one element of the air conditioning system other than the at least one compressor is less than a predetermined amount of consumed electrical power.

According to another embodiment of the present invention, a vehicle comprises a first drive source and an air conditioning system, and the air conditioning system comprises at least one compressor. The at least one compressor comprises a second drive source, and the at least one compressor is driven by the first drive source or the second drive source, or a combination thereof. The second drive source comprises an electrical power supply. The air conditioning system also comprises means for selecting at least one of the first drive source and the second drive source for driving the at least one compressor, e.g., a controller, and means for detecting an amount of electrical power consumed by the second drive source, e.g., a voltmeter or an amp meter. Moreover, the air conditioning system comprises means for controlling a rotational speed of the second drive source. Specifically, when at least one predetermined condition is satisfied and an amount of electrical power consumed by the second drive source is greater than a first limit of the amount of electrical power which the second drive source may consume, the first limit increases to a second limit.

Other objects, features, and advantages will be apparent to persons of ordinary skill in the art from the following detailed description of the invention and the accompanying drawing.

BRIEF DESCRIPTION OF THE DRAWINGS

For a more complete understanding of the present invention, the needs satisfied thereby, and the objects, features, and advantages thereof reference now is made to the following description taken in connection with the accompanying drawing.

DETAILED DESCRIPTION OF PREFERRED EMBODIMENTS

Figure 1:
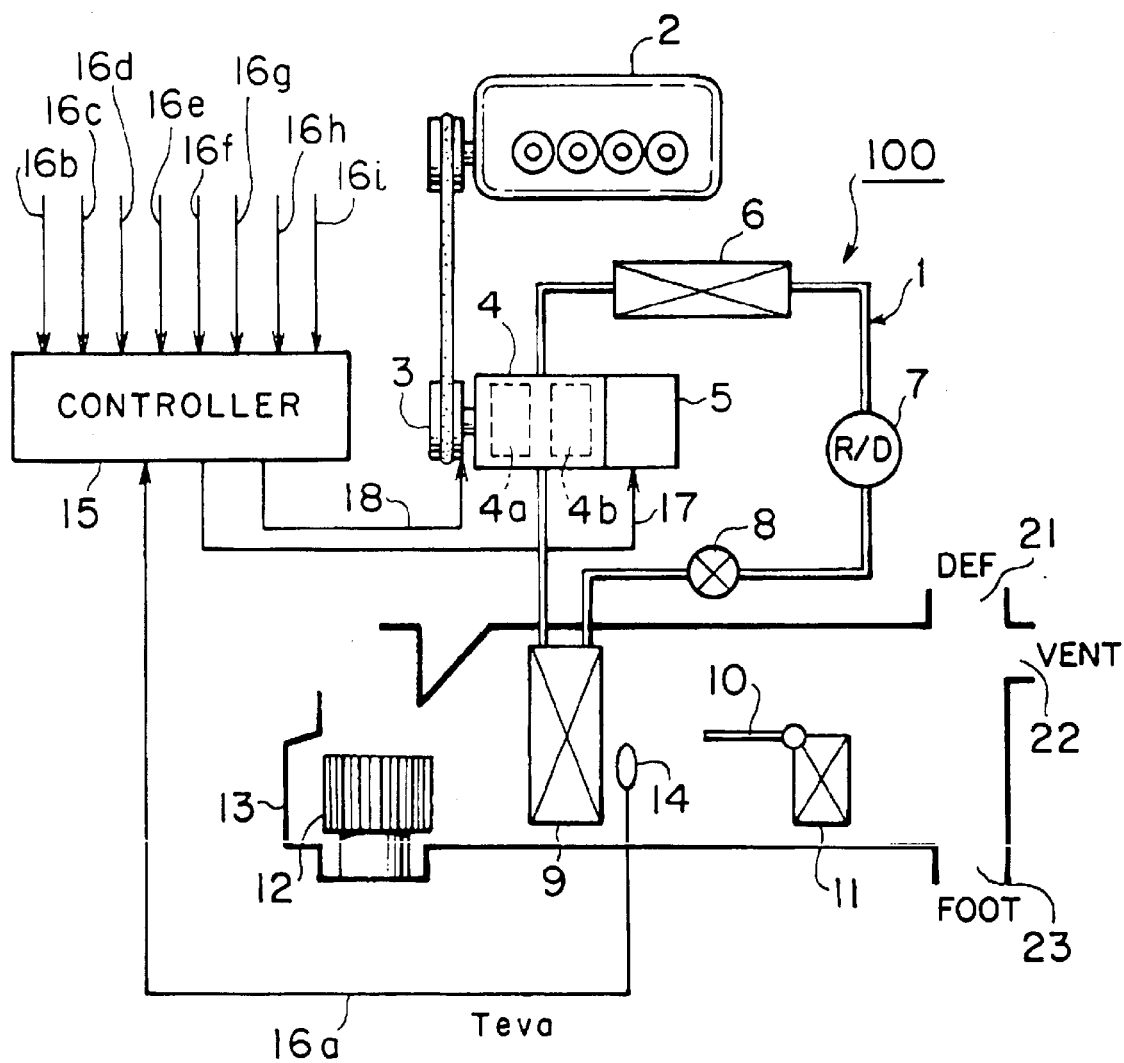
FIG. 1 is a schematic diagram of an air conditioning system according to an embodiment of the present invention.

Preferred embodiments of the present invention and their features and advantages may be understood by referring to FIG. 1.

Referring to FIG. 1, an air conditioning system 100 for a vehicle (not shown) according to an embodiment of the present invention is depicted. Air conditioning system 100 may comprise a hybrid compressor 4 and a refrigeration system 1. Hybrid compressor 4 may be a variable displacement-type compressor, a swash plate-type compressor, a rotary-type compressor, a scroll-type compressor, or the like. In an embodiment, the vehicle may comprise a first drive source 2, e.g., an engine, and hybrid compressor 4 may comprise a second drive source 5, e.g., an electric motor. In this embodiment, hybrid compressor 4 may be driven by first drive source 2, second drive source 5, or both. The driving force of drive source 2 may be transmitted to hybrid compressor 4 via an electromagnetic clutch 3 attached to hybrid compressor 4.

In another embodiment, hybrid compressor 4 may be similar to the hybrid compressor described in U.S. patent application Ser. No. 10/235,802, the disclosure of which is incorporated herein by reference. For example, hybrid compressor 4 may comprise a first compression mechanism 4a and a second compression mechanism 4b. Specifically, first drive source 2 may drive first compression mechanism 4a, and second drive source 5 may drive second compression mechanism 4b. Moreover, air conditioning system 100 may comprise means for selecting whether first drive source 2 or second drive source 5, or both, drives hybrid compressor 4. For example, the means for selecting may comprise a controller 15, and first drive source 2 and second drive source 5 may operate selectively or simultaneously in response to electrical, mechanical, or electromechanical control signals from controller 15. The vehicle also may comprise electromagnetic clutch 3 for transmitting a rotational force from first drive source 2 to a drive shaft (not shown) of hybrid compressor 4. In this embodiment, the drive shaft may comprise a first portion and a second portion. Specifically, first drive source 2 may drive the first portion of the drive shaft via electromagnetic clutch 3, and second drive source 5 may drive the second portion of the drive shaft in response to the control signals from controller 15.

In yet another embodiment, hybrid compressor 4 may be similar to the hybrid compressor described in the same U.S. patent application Ser. No. 10/235,802. For example, hybrid compressors 4 may comprise a first drive shaft and a second drive shaft. Moreover, first drive source 2 may drive the first drive shaft via electromagnetic clutch 3, and second drive source 5 may drive the second drive shaft via controller 15. In another example, air conditioning system 100 may comprise a pair of hybrid compressors 4. Specifically, a first of hybrid compressors 4 may comprise the first drive shaft, and a second of hybrid compressors 4 may comprise the second drive shaft. Moreover, first drive source 2 may drive the first drive shaft via electromagnetic clutch 3, and second drive source 5 may drive the second drive shaft via controller 15.

In any of the above-described embodiments of the present invention, refrigeration system 1 may comprise a plurality of refrigeration tubes, and a refrigerant may be circulated within refrigerant system 1 via the refrigeration tubes. Refrigeration system 1 may comprise compressor 4; a condenser 6; a receiver 7; an expansion valve 8; and an evaporator 9. Compressor 4 may be connected operationally to condenser 6, and condenser 6 may be connected operationally to receiver 7. Receiver 7 may be connected operationally to expansion valve 8, and expansion valve 8 may be connected operationally to evaporator 9. Moreover, evaporator 9 may be connected operationally to compressor 4, such that compressor 4, condenser 6, receiver 7, expansion valve 8, and evaporator 9 form a closed, refrigeration circuit. In operation, compressor 4 may received refrigerant gas from evaporator 9 and also may compress that refrigerant gas. Compressing the refrigerant gas may increase a temperature and a pressure of the refrigerant gas. Compressor 4 may pass the compressed refrigerant to condenser 6. When the compressed refrigerant gas flows through condenser 6, at least a portion of the refrigerant gas may condense into a liquid refrigerant. Moreover, condenser 6 may pass the condensed refrigerant to receiver 7, and receiver 7 may divide the condensed refrigerant into a liquid refrigerant portion and a refrigerant gas portion. Receiver 7 may pass the liquid refrigerant portion of the refrigerant to expansion valve 8, which may decrease the pressure of the liquid refrigerant. When expansion valve 8 reduces the pressure of the liquid refrigerant, expansion valve 8 may pass the refrigerant to evaporator 9, and heat exchange the refrigerant with air dispensed by a blower 12, which may evaporate the liquid refrigerant into the refrigerant gas. The refrigerant gas then may be passed to compressor 4.

Air conditioning system 100 also may comprise a heater core 11 positioned at a down stream side of evaporator 9, and an air mix damper 10 formed between the downstream side of evaporator 9 and an upstream side of heater core 11. Air mix damper 10 may be driven by a servo motor (not shown). The movement of air mix damper 10 may control a volume of air passing through heater core 11 via evaporator 9, which may control the air temperature within the interior of the vehicle. Moreover, blower 12, evaporator 9, air mix damper 10, and heater core 11 may be positioned within an air duct 13. Air conditioning system 100 also may comprise a first discharge port 21, a second discharge port 22, and a third discharge port 23. Discharge ports 21–23 may be positioned at a downstream side of air duct 13. For example, first discharge port 21 may be formed above third discharge port 23, and second discharge port 22 may be formed between first discharge port 21 and third discharge port 23. Moreover, first discharge port 21 may be used during a DEFROST mode, second discharge port 22 may be used during a VENT mode, and third discharge port 23 may be used during a FOOT mode. Such modes may determine the source from which the air entering the interior of the vehicle is drawn, or the direction in which the entering air blows, or both.

A temperature sensor 14 for measuring a temperature Teva of air dispensed from evaporator 9 may be positioned between evaporator 9 and heater core 11. Temperature sensor 14 also may be operationally connected to controller 15. Specifically, temperature sensor 14 transmits a first signal 16a to controller 15 indicating a value of Teva. In an embodiment of the present invention, the vehicle also may comprise an electrical power supply (not shown), e.g., a battery, for second drive source 5, and controller 15 may receive a second signal 16b from the electrical power supply indicating a voltage Bt of the electrical power supply. Controller 15 also may receive a third signal 16c indicating whether air conditioning system 100 currently is operating, and a fourth signal 16d indicating an amount of electric power W consumed by second drive source 5. Moreover, controller 15 may receive a fifth signal 16e indicating whether the vehicle is in an idle-stop mode, a sixth signal 16f indicating an outside air temperature Tam, and a seventh signal 16g indicating a vehicle interior temperature Tr. An idle-stop mode occurs when the vehicle's speed is less than a predetermined speed, e.g., about zero kilometers per hour, during vehicle operation. Controller 15 also may receive an eighth signal 16h indicating an amount of ambient light Tsun, and a ninth signal 16i indicating a vehicle speed Sp. Based on first signal 16a, second signal 16b, third signal 16c, fourth signal 16d, or fifth signal 16e, or a combination thereof, controller 15 may generate a first control signal 17 for controlling a rotational speed of second drive source 5, and a second control signal 18 for controlling the engagement and disengagement of electromagnetic clutch 3.

Specifically, when second drive source 5 drives compressor 4, electromagnetic clutch 3 may be disengaged, and first control signal 17 may be transmitted to second drive source 5 to control the rotational speed of second drive source 5. Nevertheless, when first drive source 2 drives compressor 4, first control signal 17 may be deactivated, second control signal 18 may be transmitted to electromagnetic clutch 3 or a controller thereof (not shown), and electromagnetic clutch 3 may be engaged. In another embodiment of the present invention, first drive source 2 and second drive source 5 may operate simultaneously. Moreover, based on temperature Teva of air dispensed from evaporator 9, controller 15 may select the rotational speed of second drive source 5, or determine whether to engage or disengage electromagnetic clutch 3.

Air conditioning system 100 also may comprise means for determining the amount of electrical power consumed by second drive source 5, e.g., a voltmeter or an amp meter, or both, for generating signal 16d, and means for controlling the rotational speed of second drive source 5, e.g., controller 15. When second drive source 5 drives compressor 4, the means for determining may determine the amount of electrical power consumed by second drive source 5, and may compare the amount of electrical power consumed by second drive source 5 to a first limit of the amount of electrical power which second drive source S may consume. When the amount of electrical power consumed by second drive source 5 is greater than the first limit, the means for controlling may reduce the rotational speed of second drive source 5, such that the amount of electrical power consumed by second drive source 5 decreases. Specifically, the rotational speed of second drive source 5 may be reduced until the amount of electrical power consumed by second drive source 5 is less than or equal to the first limit of the amount of electrical power which second drive source 5 may consume.

Nevertheless, during the operation of air conditioning system 100, and depending on several factors, it may be desirable to alter the limit for the amount of electrical power which second drive source 5 consume. Such factors may include whether the vehicle is in an idle-stop mode, the load of refrigeration system 1, the amount of electric power stored in the electric power supply, or the amount of power consumed by components of air conditioning system 100 other than compressor 4, or a combination thereof. In an embodiment of the present invention air conditioning system 100 may comprise means for determining whether the vehicle is in an idle-stop mode, e.g., a sensor for generating signal 16e, and means for estimating the load of refrigeration system 1, e.g., a plurality of sensors for generating signals 16f–16i. Air conditioning system 100 also may comprise means for determining the amount of electric power stored in the electric power supply, e.g., a voltmeter or an amp meter, or both, for generating signal 16b, and means for estimating the amount of power consumed by components of air conditioning system 100 other than compressor 4, e.g., a voltmeter or an amp meter, or both, for determining the amount of power consumed by blower 12, and a voltmeter or an amp meter, or both, for determining the amount of power consumed by a cooling fan of condenser 6.

Moreover, based on one or more of the above-described factors, the limit for the amount of electrical power which second drive source 5 may consume may be updated. Consequently, when the means for controlling controls the rotational speed of second drive source 5, such control is based on the most recently undated limit for the amount of electrical power which second drive source 5 may consume.

In an embodiment of the present invention, the limit for the amount of electrical power which second drive source 5 may consume may be based on at least whether the vehicle is operating in an idle-stop mode and whether the load of refrigeration system 1 is greater than a predetermined load. Specifically, when the vehicle is operating in an idle-stop mode, the load of refrigeration system 1 may be estimated based on at least signal 16f (outside air temperature) or signal 16h (ambient light), or both. In contrast, when the vehicle is not operating in an idle-stop mode, the load of refrigeration system 1 may be estimated based on at least signal 16i (vehicle speed) or signal 16g (inside air temperature), or both.

For example, when the vehicle is in an idle-stop mode, and signal 16f indicates that the outside temperature is greater than a predetermined outside temperature, it may be likely that the temperature of air inside the vehicle will rise unless air conditioning system 100 dispenses cooled air inside the vehicle. Similarly, when the vehicle is in an idle-stop mode, and signal 16h indicates that the amount of ambient light is greater than a predetermined amount of ambient light, it may be likely that the temperature of air inside the vehicle will rise unless air conditioning system 100 dispenses cooled air inside the vehicle. In an embodiment, when the vehicle is in an idle-stop mode, and the outside temperature is greater than a predetermined outside temperature or the amount of ambient light is greater than a predetermined amount of ambient light, or both, the means for controlling may decrease the rotational speed of second drive source 5 to decrease the amount of power consumed by second drive source 5. The limit for the amount of electrical power which second drive source 5 may consume then may increase from the first limit to a second limit. If the amount of power consumed by second drive source 5 subsequently becomes greater than the second limit for the amount of electrical power which drive source 5 may consume, the means for controlling again may decrease the rotational speed of second drive source 5, and the second limit may increase to a third limit. In an embodiment, the limit for the amount of electrical power which second drive source 5 may consume may reset to the first limit when operation of the vehicle concludes.

In contrast, when the vehicle is in an idle-stop mode, and signal 16f indicates that the temperature of air outside the vehicle is less than or equal to the predetermined outside air temperature, it may be unlikely that the temperature of air inside the vehicle will rise or substantially rise if air conditioning system 100 does not dispense cooled air inside the vehicle. Similarly, when the vehicle is in an idle-stop mode, and signal 16h indicates that the amount of ambient light is less than or equal to the predetermined amount of ambient light, it may be unlikely that the temperature of air inside the vehicle will rise or substantially rise if air conditioning system 100 does not dispense cooled air inside the vehicle. In this embodiment, when the amount of power consumed by second drive source 5 is greater than the limit for the amount of electrical power which second drive source 5 may consume, the means for controlling may decrease the rotational speed of second drive source 5, such that the amount of power consumed by second drive source 5 is decreases, e.g., to the first limit.

When the vehicle is not operating in an idle-stop mode, and at least second drive source 5 is driving compressor 4, the optimum value for the variable, maximum amount of electrical power may be based on at least signal 16i (vehicle speed). Specifically, when the vehicle's speed is greater than a predetermined speed, the amount of electrical power consumed by air conditioning system 100 may be less than the amount of electrical power consumed by air conditioning system 100 when the vehicle's speed is less than or equal to the predetermined speed. For example, when the vehicle's speed is greater than the predetermined speed, the condenser fan of condenser 6 may be inactive. Moreover, the amount of electric power consumed by air conditioning system 100 when the condenser fan is inactive is less than the amount of electric power consumed by air conditioning system 100 when the condenser fan is active. As such, the limit for the amount of electrical power which second drive source 5 may consume may increase when the vehicle's speed increases.

In another embodiment of the present invention, the optimum value for the variable, maximum amount of electrical power may be based on at least signal 16b (the amount of electrical power stored in the electrical power supply). Specifically, independent of whether the vehicle is operating in an idle-stop mode or whether the load of refrigeration system 1 is greater than the predetermined load, if the storage capacity of the electrical power supply already is maximized or is substantially maximized, decreasing the rotational speed of second drive source 5 may not increase the amount of electrical power stored in the electrical power supply. In.this embodiment, when the storage capacity of the electrical power supply is maximized or is substantially maximized, and the amount of electrical power consumed by second drive source 5 is greater than the limit for the amount of electrical power which second drive source 5 may consume, the limit increases, e.g., from the first limit to the second limit or from the second limit to the third limit. Nevertheless, when the storage capacity of the electrical power supply is not maximized or is not substantially maximized, and the amount of electrical power consumed by second drive source 5 is greater than the limit for the amount of electrical power which second drive source 5 may consume, the limit for the amount of electrical power which second drive source 5 may consume may be adjusted in accordance with the above-described embodiments of the present invention, e.g., based on at least the load of refrigeration system 1 and whether the vehicle is operating in an idle-stop mode.

In yet another embodiment of the present invention, the limit for the amount of electrical power which second drive source 5 may consume may be based on at least the amount of power consumed by components of air conditioning system 100 other than compressor 4. For example, as described above, when the vehicle's speed is greater than the predetermined speed, the condenser fan of condenser 6 may be inactive. Consequently, the amount of electric power consumed by air conditioning system 100 when the condenser fan is inactive may be less than the amount of electric power consumed by air conditioning system 100 when the condenser fan is active. When the total amount of power consumed by the components of air conditioning system 100 other than compressor 4 decreases, compressor 4 may consume more electric power without increasing the total amount of electric power consumed by conditioning system 100. Consequently, when the total amount of power consumed by the components of air conditioning system 100 other than compressor 4 decreases, the limit for the amount of electrical power which second drive source 5 may consume may increase.

While the invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are consider exemplary only, with the true scope of the invention indicated by the following claims.

What is claimed is:

1. An air conditioning system for a vehicle comprising a first drive source, wherein the air conditioning system comprises:

at least one compressor comprising a second drive source, wherein the at least one compressor is driven by the first drive source or the second drive source, or a combination thereof and the second drive source comprises an electrical power supply;

means for selecting at least one of the first drive source and the second drive source for driving the at least one compressor;

means for detecting an amount of electrical power consumed by the second drive source; and means for controlling a rotational speed of the second drive source, wherein when at least one predetermined condition is satisfied and the amount of electrical power consumed by the second drive source is greater than a first limit for the amount of electrical power which the second drive source may consume, the first limit increases to a second limit.

2. The air conditioning system of claim 1, wherein the means for controlling reduces the rotational speed of the second drive source before the first limit increases to the second limit.

3. The air conditioning system of claim 1, wherein the at least one compressor further comprises:

a first compression mechanism driven by the first drive source; and a second compression mechanism driven by the second drive source.

4. The air conditioning system of claim 1, wherein the air conditioning system further comprises a refrigeration system, and the at least one predetermined condition is satisfied when a load of the refrigeration system is greater than a predetermined load.

5. The air conditioning system of claim 4, wherein the load of the refrigeration system is greater than the predetermined load when an amount of ambient light is greater than a predetermined amount of ambient light.

6. The air conditioning system of claim 4, wherein the load of the refrigeration system is greater than the predetermined load when a temperature of air outside the vehicle is greater than a predetermined outside air temperature.

7. The air conditioning system of claim 4, wherein the load of the refrigeration system is greater than the predetermined load when a temperature of air inside the vehicle is greater than a predetermined inside air temperature.

8. The air conditioning system of claim 4, wherein the load of the refrigeration system is greater than the predetermined load when a speed of the vehicle is greater than a predetermined vehicle speed.

9. The air conditioning system of claim 1, wherein the at least one predetermined condition is satisfied when an amount of electric power stored in the electric power supply is greater than or equal to a predetermined amount of stored electric power.

10. The air conditioning system of claim 1, wherein the at least one predetermined condition is satisfied when the vehicle is operating in an idle-stop mode and an amount of ambient light is greater than a predetermined amount of ambient light.

11. The air conditioning system of claim 1, wherein the at least one predetermined condition is satisfied when the vehicle is operating in an idle-stop mode and a temperature of air outside the vehicle is greater than a predetermined outside air temperature.

12. The air conditioning system of claim 1, wherein the air conditioning system further comprises a refrigeration system, and the at least one predetermined condition is satisfied when a load of the refrigeration system is greater than or equal to a predetermined load or when an amount of electric power stored in the electric power supply is greater than or equal to a predetermined amount of stored electric power.

13. The air conditioning system of claim 12, wherein the load of the refrigeration system is greater than the predetermined load when an amount of ambient light is greater than a predetermined amount of ambient light.

14. The air conditioning system of claim 12, wherein the load of the refrigeration system is greater than the predetermined load when a temperature of air outside the vehicle is greater than a predetermined outside air temperature.

15. The air conditioning system of claim 12, wherein the load of the refrigeration system is greater than the predetermined load when a temperature of air inside the vehicle is greater than a predetermined inside air temperature.

16. The air conditioning system of claim 12, wherein the load of the refrigeration system is greater than the predetermined load when a speed of the vehicle is greater than a predetermined vehicle speed.

17. The air conditioning system of claim 12, wherein the predetermined amount of stored electric power is about equal to a maximum amount of electrical power which the electrical power supply may store.

18. The air conditioning system of claim 1, wherein the at least one predetermined condition is satisfied when an amount of electrical power consumed by at least one element of the air conditioning system other than the at least one compressor is less than a predetermined amount of consumed electrical power.

19. The air conditioning system of claim 18, wherein the at least one element of the air conditioning system other than the at least one compressor comprises:

a blower for sending air into an interior of the vehicle; and a cooling fan for cooling a condenser of the air conditioning system.

20. The air conditioning system of claim 1, wherein the first drive source comprises an engine, the second drive source comprises an electric motor, and the electric power supply comprises a battery.

21. A vehicle comprising:

a first drive source; and an air conditioning system, wherein the air conditioning system comprises:

at least one compressor comprising a second drive source, wherein the at least one compressor is driven by the first drive source or the second drive source, or a combination thereof, and the second drive source comprises an electrical power supply;

means for selecting at least one of the first drive source and the second drive source for driving the at least one compressor;

means for detecting an amount of electrical power consumed by the second drive source; and means for controlling a rotational speed of the second drive source, wherein when at least one predetermined condition is satisfied and the amount of electrical power consumed by the second drive source is greater than a first limit for the amount of electrical power which the second drive source may consume, the first limit increases to a second limit.

22. The air conditioning system of claim 21, wherein the means for controlling reduces the rotational speed of the second drive source before the first limit increases to the second limit.

23. The vehicle of claim 21, wherein the air conditioning system further comprises a refrigeration system, and the at least one predetermined condition is satisfied when a load of the refrigeration system is greater than a predetermined load.

24. The vehicle of claim 21, wherein the at least one predetermined condition is satisfied when an amount of electric power stored in the electric power supply is greater than or equal to a predetermined amount of stored electric power.

25. The vehicle of claim 21, wherein the air conditioning system further comprises a refrigeration system, and the at least one predetermined condition is satisfied when a load of the refrigeration system is greater than or equal to a predetermined load or when an amount of electric power stored in the electric power supply is greater than or equal to a predetermined amount of stored electric power.

26. The vehicle of claim 21, wherein the at least one predetermined condition is satisfied when an amount of electrical power consumed by at least one element of the air conditioning system other than the at least one compressor is less than a predetermined amount of consumed electrical power.

27. An air conditioning system for a vehicle comprising a first drive source, wherein the air conditioning system comprises:

at least one compressor comprising a second drive source, wherein the at least one compressor is driven by the first drive source or the second drive source, or a combination thereof, and the second drive source comprises an electrical power supply;

means for selecting at least one of the first drive source and the second drive source for driving the at least one compressor;

means for detecting an amount of electrical power consumed by the second drive source; and means for controlling a rotational speed of the second drive source, such that when the amount of electrical power consumed by the second drive source is greater than a first limit for the amount of electrical power which the second drive source may consume, the means for controlling reduces the rotational speed of the second drive source, and when at least one predetermined condition is satisfied, the first limit for the amount of electrical power which the second drive source may consume increases to a second limit.

* * * * *